FACSIMILE SYSTEM WITH VIDICON RESCANNING DURING RETRACE

Filed May 18, 1965 2 Sheets-Sheet 1

INVENTORS
Roman A. Adams
John J. Maginot, Jr.
by McDougall, Hersh & Scott
Attys

INVENTORS
Roman A. Adams
John J. Maginot, Jr.
by McDougall, Hersh & Scott
Attys

United States Patent Office 3,414,668
Patented Dec. 3, 1968

3,414,668

FACSIMILE SYSTEM WITH VIDICON RESCANNING DURING RETRACE

Roman A. Adams, Skokie, and John J. Maginot, Jr., Des Plaines, Ill., assignors to A. B. Dick Company, Niles, Ill., a corporation of Illinois Filed May 18, 1965, Ser. No. 456,632
3 Claims. (Cl. 178—7.7)

ABSTRACT OF THE DISCLOSURE

A facsimile system comprising a vidicon scanning tube including an electron gun to produce an electron beam for scanning the mosaic screen of said tube, means for projecting an optical image on said screen, means for deflecting the electron beam to scan said screen, said deflecting means comprising a line scanning sweep generator and a frame scanning sweep generator for causing deflection of the electron beam along rectangularly related axes, said frame scanning sweep generator comprising means for generating a sawtooth sweep signal having a gradually rising scanning portion and an abruptly declining retrace portion, and means for blanking the electron beam during only a portion of said retrace whereby a portion of the mosaic screen is rescanned by the beam during the remaining portion of the retrace, said frame scanning sweep generator comprising means for producing a retrace signal having an abruptly declining blanked portion and a gradually declining rescanning portion, said rescanning portion being at a scanning rate comparable to the rate during the gradually rising scanning portion.

This invention relates to facsimile systems for reproducing printed or written material.

One object of the present invention is to provide a new and improved facsimile system of the type utilizing a vidicon tube, whereby an optical image of the material to be reproduced is transformed into an electrostatic image which is then scanned by an electron beam so as to produce video or facsimile signals.

In such facsimile systems, the electrostatic image is produced on the mosaic screen of the vidicon tube when the light from the optical image falls on the photo sensitive elements of the mosaic screen. The electron beam recharges the photo sensitive elements and thereby erases the electrostatic image. The video signals are derived from the recharging current to a collector electrode.

The present invention is particularly applicable to such facsimile systems in which a series of different images are reproduced in rapid succession. Each image may be projected momentarily upon the mosaic screen of the vidicon tube. The screen is then scanned by the electron beam. Another image may then be projected on the screen of the vidicon tube, and so forth. It has been found that the electrostatic image produced by the first optical image is not completely erased by the scanning of the image by the electron beam, and that a portion of the electrostatic image will remain when the next image is produced and scanned. This overlapping of successive images tends to reduce the clarity and definition of the images.

A further object of the present invention is to provide such a new and improved facsimile system in which all or a portion of the mosaic screen of the vidicon tube is rescanned by the electron beam during the retrace of the electron beam between successive frames. It has been found that the rescanning of the mosaic screen substantially reduces the overlapping of successive images, so that the definition of the images is considerably improved.

Another object is to provide such a new and improved facsimile system in which the rescanning of the mosaic screen is confined to a portion of the retrace interval, so that only a portion of the mosaic screen is rescanned by the electron beam. By this procedure, it is possible to do an effective job of rescanning the selected portion of the screen, so that the previous image may be thoroughly erased from this portion. In this way, the definition may be improved to a greater extent in the most critical portion of the image area. In most cases, it is preferred to rescan the initial portion of the image, because the overlapping is generally most serious in the portion of the image which is scanned first by the electron beam.

Figure 1:
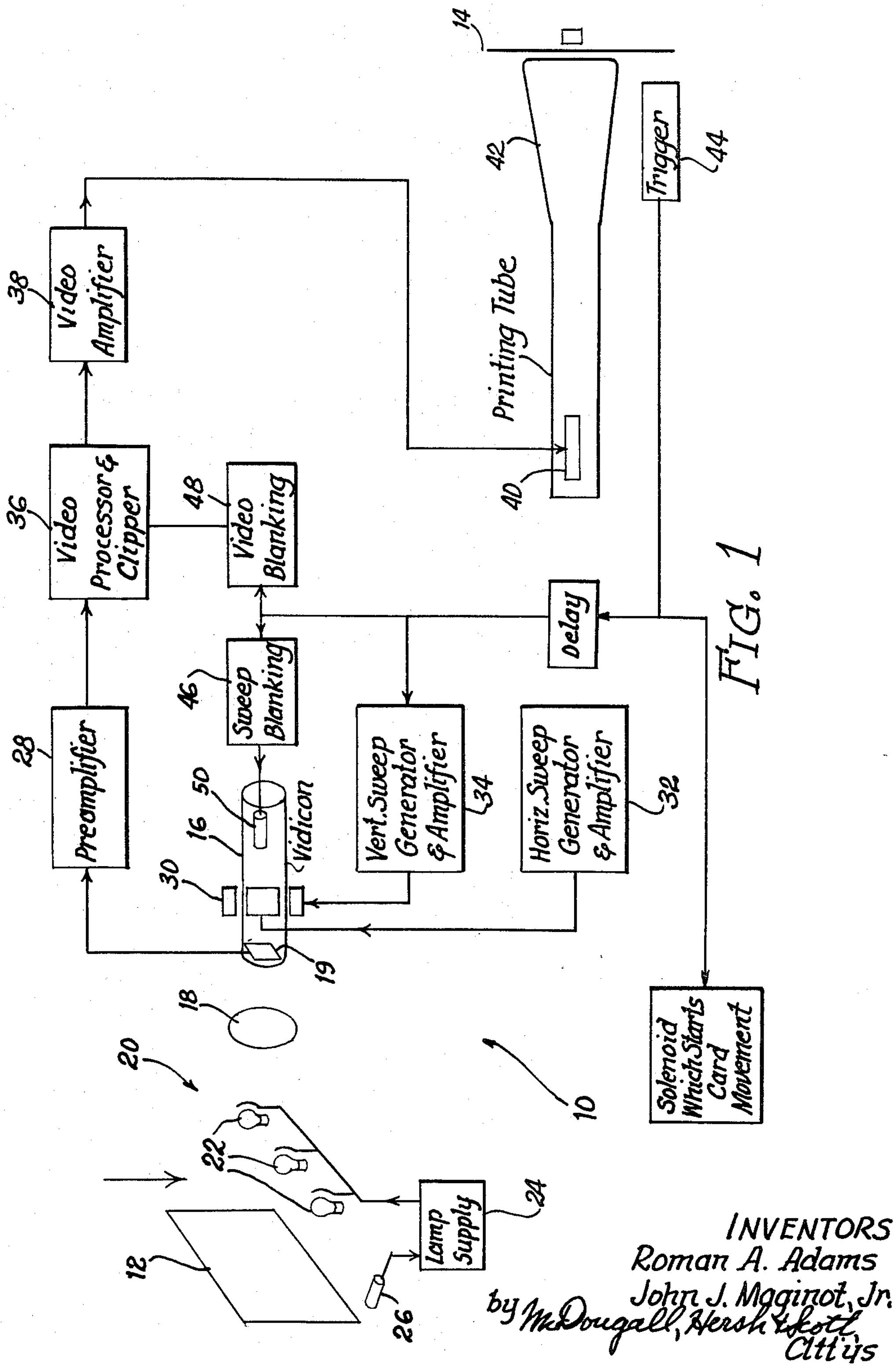

Further objects and advantages of the present invention will appear from the following description, taken with the accompanying drawings, in which:

FIG. 1 is a diagrammatic view of a facsimile system to be described as an illustrative embodiment of the present invention.

Figure 2:
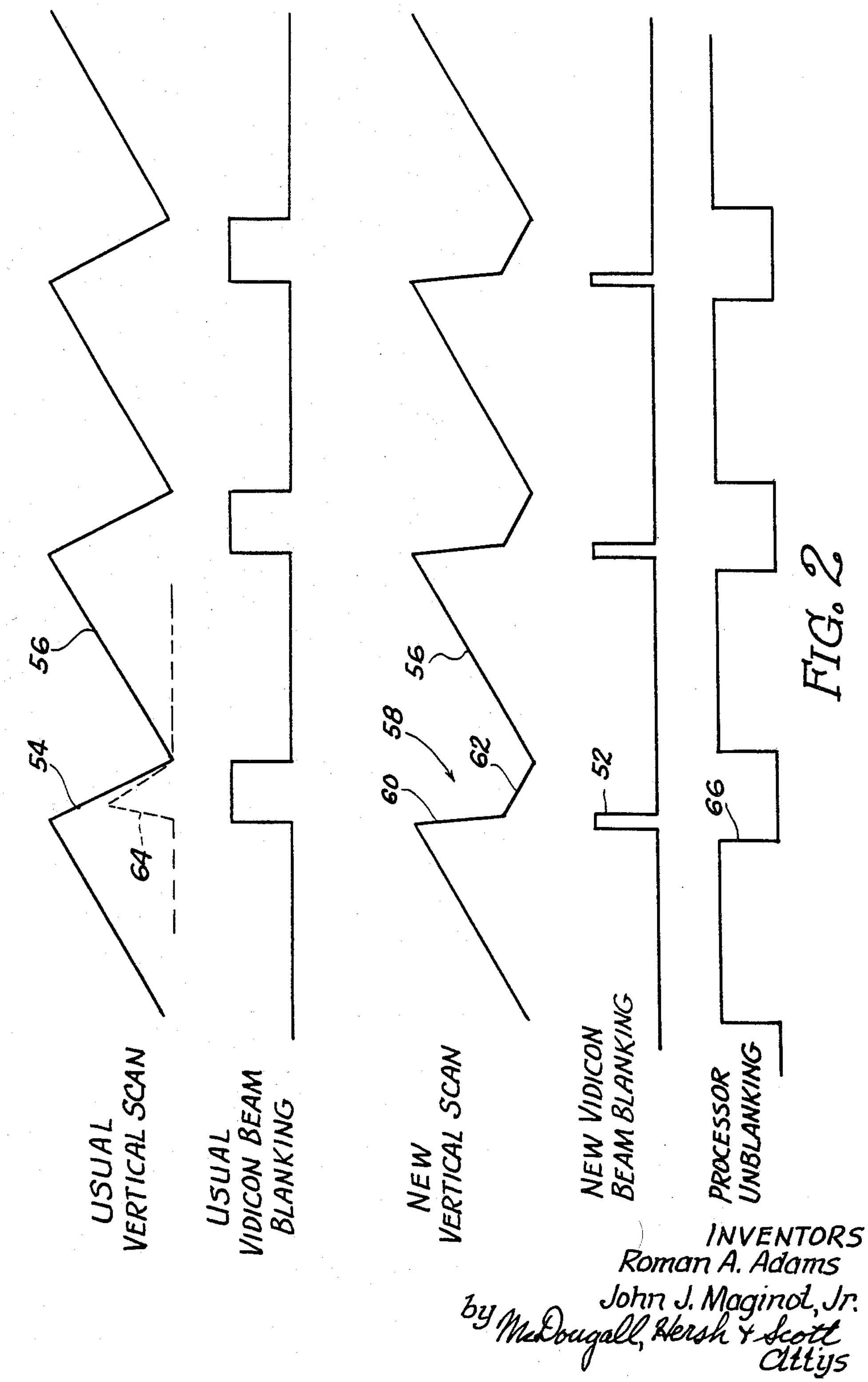

FIG. 2 comprises a series of oscillograms or diagrams showing the wave form of various scanning and blanking signals employed in the system of FIG. 1.

As just indicated, FIG. 1 illustrates a facsimile system 10 which is an example of one type to which the present invention is applicable. The facsimile system 10 is intended primarily for reproducing addresses or the like which are printed or written on master address cards 12. The addresses are reproduced on a paper tape or other continuous web 14 to form a continuous series of address labels. By means of suitable machinery, the individual labels may be severed from the tape 14 and applied to magazines, newspapers, mailing pieces or the like. Thus, the facsimile system 10 may appropriately be characterized as a label printing system or machine.

A label printing machine of this type is capable of operation at extremely high speeds. The master address cards 12 are fed rapidly through the machine and are reproduced on the rapidly moving paper tape 14.

As a scanning device, the facsimile system 10 employs a vidicon tube 16 of the well-known type. A lens 18 is provided to project an optical image of the printed matter on each card 12 upon the mosaic screen 19 of the vidicon tube 16.

In order that the cards 12 may be fed continuously through the machine, a stroboscopic lamp system 20 is employed to illuminate the successive cards 12. Thus, the lamp system 20 may comprise one or more stroboscopic flash lamps 22 adapted to produce extemely brief but intense flashes of light. The lamp system 20 comprises a power supply and control unit 24 for energizing and triggering the flash lamps 22. The lamps may be triggered automatically by the movement of the cards 12, so that each card will be illuminated by a bright flash of light when it reaches the correct position for projection of the printed matter on the screen of the vidicon 16. The triggering system may employ a photocell 26 which produces a signal when the leading edge of each card passes the photocell.

Those skilled in the art will be familiar with vidicon tubes, which have been used very extensively for television and facsimile systems. The optical image is transformed into an electrostatic image on the mosaic screen of the vidicon tube 16. This electrostatic image is subject to decay, but persists for a sufficient interval to provide for scanning of the electrostatic image by the electron beam of the vidicon tube. The electron beam recharges the photo sensitive elements of the mosaic screen, and the recharging currents provide a video signal which is amplified by a preamplifier 28. The electron beam is caused to scan the mosaic screen by a deflection yoke 30 which is supplied with horizontal and vertical scanning signals by horizontal and vertical sweep generator and amplifier circuits 32 and 34. The scanning or sweep signals are generally saw-toothed in wave form, as will be evident from FIGS. 2*a* and 2*c*.

In the illustrated facsimile system 10, the video signals from the preamplifier 28 pass through a video processor 36 and thence to a video amplifier 38. The video processor 36 squares the wave form of the video signals and also provides a gating or blanking action, as will be explained in detail shortly. The amplified video signals from the amplifier 38 are applied to the electron gun 40 of an electronic printing tube 42. Thus, the video signals control the intensity of the electron beam produced by the electron gun 40. The electronic printing tube 42 is of the well-known type adapted to reproduce electrostatic images of the printed matter on the rapidly moving paper tape 14. The electrostatic images are rendered visible and permanent by suitable developing and fixing procedures which will be well-known to those skilled in the art. In one well-known system, the electrostatic images are developed by applying a toner powder to the paper tape 14. The images are then fixed by applying heat so as to fuse the toner powder to the tape. In another system, the toner is carried by a volatile liquid which is applied to the tape and is caused to evaporate so as to fix the image.

In the illustrated facsimile system 10, the movement of the master address cards 12 is mechanically synchronized with the movement of the paper tape 14 by using an appropriate trigger pulse. The vertical sweep generator 34 is synchronized with the movement of the paper tape 14 by providing a trigger device 44 which generates pulses in response to the movement of the tape 14. The trigger pulses are applied to the vertical sweep generator 34.

The trigger pulses from the device 44 are also applied to a sweep blanking generator 46 and a video blanking generator 48. The sweep blanking generator 46 produces pulses which blank the electron beam in the vidicon tube 16 during a portion of the retrace interval of the vertical sweep. The beam blanking pulses are applied to the electron gun 50 of the vidicon tube 16. The video blanking generator 48 produces pulses which blank the video signal and prevent it from passing through the video processor 36 during the vertical retrace interval. Thus, the video processor 36 performs a gating function to gate the video signal to the video amplifier 38 during the main vertical scan of the vidicon tube.

FIG. 2 shows the wave forms of various scanning and blanking signals which are employed in the facsimile system. FIG. 2*c* shows the preferred wave form of the vertical scan or sweep. FIG. 2*d* shows the preferred form of the pulses for blanking the vidicon beam. FIG. 2*e* shows the wave form of the video unblanking or gating pulses which are applied to the video processor 36 to gate the video signals to the video amplifier 38.

FIG. 2*a* is provided for the purpose of comparison with FIG. 2*c*. FIG. 2*a* shows the usual wave form of the vertical scanning signals in facsimile systems of this type. Similarly, FIG. 2*b* is provided for a comparison with FIG. 2*d*. FIG. 2*b* shows the usual wave form of the beam blanking signals applied to the vidicon tube.

In accordance with the present invention, the sweep or beam blanking generator 46 is constructed and arranged so as to provide beam blanking pulses 52 which are substantially briefer than the retrace portion of the vertical sweep signal. In FIG. 2*a*, the retrace portion is represented by the steep downwardly sloping portion 54 of the saw-toothed wave. The main scanning portion of the vertical sweep is represented by the upwardly inclined portion 56 of gradual slope. Inasmuch as the blanking pulse 52 covers only a portion of the retrace interval, the beam of the vidicon tube is energized during the remaining portion of the retrace, so that rescanning of the mosaic screen 19 takes place during such remaining portion. Such rescanning is employed to erase the previous image with a greater degree of effectiveness.

In accordance with the present invention, the vertical sweep signal preferably has a modified saw-tooth wave form as shown in FIG. 2*c*. This saw-tooth wave utilizes the same upwardly sloping main scanning portion 56 as illustrated in FIG. 2*a*. However, the saw-tooth wave has a modified retrace portion 58 which comprises two parts 60 and 62. Both parts 60 and 62 slope downwardly. However, the part 60 slopes downwardly at an extremely steep angle, while the part 62 slopes downwardly more gradually, at a rate comparable to the slope of the main scanning portion 56. The portion 60 of the retrace represents the portion which is blanked by the blanking pulse 52. The portion 62 is left unblanked and constitutes the rescanning portion of the retrace. During the rescanning portion 62, the speed of the vertical scan is the same as or comparable to the speed during the main scanning portion 56, so that a portion of the mosaic screen 19 is thoroughly rescanned. In this way, the corresponding portion of the residual image is effectively erased.

The vertical sweep generator 34 is preferably constructed and arranged to produce the improved wave form of FIG. 2*c*. Such wave form can readily be produced by circuits known to those skilled in the art, so that it will not be necessary to describe such circuits. For example, the wave form of FIG. 2*c* may be produced by superimposing another saw-toothed wave upon the saw-toothed wave of FIG. 2*a*. Thus, in FIG. 2*a*, the broken lines represent a saw-toothed wave 64 which may be subtracted from the retrace portion 54 of the vertical sweep to produce the modified retrace 58 as shown in FIG. 2*c*. Other pulse forming techniques may be employed to produce the modified retrace.

The video gating or unblanking pulses 66 of FIG. 2*e* are timed so that the video processor 36 is blanked during the entire retrace 58. Thus, the video processor 36 prevents any video signals from being transferred to the printing tube 42 during the retrace interval. The rescanning of the mosaic screen 19 during a portion of the retrace produces various video signals which are not useful for printing purposes.

It will undoubtedly be helpful to summarize the operation of the facsimile system 10. The master address cards 12 are fed rapidly through the machine so that each card passes the position in which the address or other printed matter on the card will be projected onto the mosaic screen 19 of the vidicon tube. When each card 12 reaches this position, the flash lamps 22 are triggered by the photocell 26 so that the lamps produce a brilliant flash of light on the card 12. The flash is of extremely brief duration so that it is not necessary to stop or interrupt the motion of the card.

In the vidicon tube 16, the optical image of the printed matter is transformed into an electrostatic image on the mosaic screen 19. Due to the horizontal and vertical sweep signals from the sweep generators 32 and 34, the electron beam of the vidicon tube 16 is caused to scan the mosaic screen 19 with a series of scanning lines. The horizontal sweep signal has a saw-tooth wave form similar to that shown in FIG. 2*a* but at a much higher frequency than the vertical sweep signal.

The scanning of the mosaic screen 19 produces video signals which are transmitted by the preamplifier 28, the video processor 36 and the video amplifier 38 to the electron gun 40 of the electronic printing tube 42. By means of the printing tube 42 and its associated circuits, an electrostatic image is produced on the paper tape 14 corresponding to the image on the mosaic screen 19 of the vidicon tube 16. This electrostatic image is developed and fixed so that the addresses on the master cards 12 will be reproduced on the paper tape 14 for use as mailing labels.

The scanning of the mosaic screen 19 by the electron beam recharges the photo sensitive elements of the mosaic screen so as to erase the electrostatic image. However, the recharging is only partial, so that the electrostatic image is only partially erased. Thus, when the electrostatic image of the next address card is produced on the mosaic screen 19, there is still a residual portion of the preceding image on the screen. This overlapping of images tends to reduce the clarity and definition of the images printed on the paper tape 14.

In accordance with the present invention, however, at least a portion of the mosaic screen 19 is rescanned during the vertical retrace of the electron beam, so that at least this portion of the screen is more effectively erased. It is preferred to rescan only a portion of the mosaic screen, so that the most critical portion of the image may be more effectively erased.

To provide for rescanning of the vidicon tube during the vertical retrace, the vertical beam blanking pulses 52, as shown in FIG. 2*d*, are made considerably shorter than the retrace interval, so that the beam is blanked during only a portion of the retrace. Rescanning occurs during the remaining portion. The wave form of the vertical retrace signal is modified so that the scanning rate is slow during the rescanning portion. In this way, the rescanning is more thorough and effective. During the blanked portion of the retrace, the scanning rate is extremely rapid. In FIG. 2*c*, the blanked portion of the retrace is shown at 60, while the rescanning portion is shown at 62.

Any particular portion of the vidicon screen may be rescanned, but it is preferred to rescan the initial portion which is scanned first by the electron beam during the main vertical scan. This initial portion is normally the most critical portion with respect to the problem of overlapping images. Thus, the rescanning of the initial portion normally reduces the problem to negligible proportions so that there is no serious impairment of the definition of the printed images.

Various other modifications, alternative constructions and equivalents may be employed without departing from the true spirit and scope of the invention, as exemplified in the foregoing description and defined in the following claims.

We claim:

1. In a facsimile system,
the combination comprising a vidicon scanning tube having a mosaic screen,
an electron gun in said tube for producing an electron beam to scan said screen,
means for projecting an optical image upon said screen,
means for deflecting the electron beam to scan said screen,
said last mentioned means comprising a line scanning sweep generator and a frame scanning sweep generator for causing deflection of the electron beam along rectangularly related axes.
said frame scanning sweep generator comprising means for generating a saw-tooth sweep signal having a gradually rising scanning portion and an abruptly declining retrace portion,
and means for blanking the electron beam of the vidicon tube during only a portion of said retrace whereby a portion of the mosaic screen is rescanned by the electron beam during the remaining portion of the retrace.

2. The combination of claim 1,
in which said frame scanning sweep generator comprises means for producing a retrace signal having an abruptly declining blanked portion and a gradually declining rescanning portion.

3. The combination of claim 2,
in which said last mentioned means is constructed and arranged to produce a rescanning portion having a scanning rate comparable to the scanning rate of said gradually rising scanning portion.

References Cited

UNITED STATES PATENTS

| | | | |
|---|---|---|---|
| 2,717,329 | 9/1955 | Jones | 178—7.7 |
| 2,885,596 | 5/1959 | Kaufmann | 178—7.7 |

ROBERT L. GRIFFIN, *Primary Examiner.*

H. W. BRITTON, *Assistant Examiner.*